United States Patent
Isomura

(10) Patent No.: US 9,281,714 B2
(45) Date of Patent: Mar. 8, 2016

(54) UNINTERRUPTIBLE POWER SYSTEM, METHOD OF CONTROLLING POWER SUPPLY, AND RECORDING MEDIUM HAVING POWER SUPPLY CONTROL PROGRAM STORED THEREIN

(71) Applicant: NEC Corporation, Minato-ku, Tokyo (JP)

(72) Inventor: Masakazu Isomura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 590 days.

(21) Appl. No.: 13/716,792

(22) Filed: Dec. 17, 2012

(65) Prior Publication Data
US 2013/0154377 A1   Jun. 20, 2013

(30) Foreign Application Priority Data
Dec. 19, 2011   (JP) .................................. 2011-277705

(51) Int. Cl.
*H02J 7/00*   (2006.01)
*H02J 9/04*   (2006.01)
*H02J 9/06*   (2006.01)

(52) U.S. Cl.
CPC . *H02J 9/04* (2013.01); *H02J 9/062* (2013.01); *Y10T 307/62* (2015.04)

(58) Field of Classification Search
USPC .......................................................... 361/65
See application file for complete search history.

(56) References Cited

U.S. PATENT DOCUMENTS

| 5,184,025 | A   | * | 2/1993  | McCurry et al. ................. 307/66 |
| 5,959,368 | A   |   | 9/1999  | Kubo et al. |
| 7,414,381 | B2  | * | 8/2008  | Popescu-Stanesti et al. . 320/126 |
| 8,183,826 | B2  | * | 5/2012  | Tuffner et al. ................ 320/107 |
| 8,901,888 | B1  | * | 12/2014 | Beckman ...................... 320/125 |
| 8,957,543 | B2  | * | 2/2015  | Adelson et al. ................. 307/19 |
| 2004/0033398 | A1 | * | 2/2004 | Kearl et al. ..................... 429/22 |
| 2005/0043859 | A1 | * | 2/2005 | Tsai et al. ..................... 700/286 |
| 2012/0043818 | A1 | * | 2/2012 | Stratakos et al. ............... 307/77 |
| 2012/0235482 | A1 | * | 9/2012 | Pereira ........................... 307/29 |

(Continued)

FOREIGN PATENT DOCUMENTS

| CN | 101277028 A | 10/2008 |
| CN | 202059209 U | 11/2011 |

(Continued)

OTHER PUBLICATIONS

Chinese Office Action for CN Application No. 201210548247.8 mailed on Dec. 26, 2014 with English Translation.

(Continued)

*Primary Examiner* — Ronald W Leja

(57) ABSTRACT

An uninterruptible power system includes a plurality of uninterruptible power units connected in parallel to input power. One uninterruptible power unit includes a rechargeable battery, a charging circuit that supplies a charging current to the rechargeable battery, and an output circuit that outputs power supplied from the rechargeable battery as output power. The uninterruptible power system includes a path switching unit in which switching of a path for power received among the charging circuit, the rechargeable battery and the output circuit in the plurality of uninterruptible power units is performed, and a control unit that controls the path switching unit so that switching of the path is performed according to states of the uninterruptible power units.

6 Claims, 6 Drawing Sheets

(56) References Cited

U.S. PATENT DOCUMENTS

| | | | |
|---|---|---|---|
| 2012/0267952 A1* | 10/2012 | Ballatine et al. | 307/26 |
| 2013/0154377 A1* | 6/2013 | Isomura | 307/65 |
| 2014/0184162 A1* | 7/2014 | Takahashi et al. | 320/128 |
| 2014/0217986 A1* | 8/2014 | Skipper | 320/134 |

FOREIGN PATENT DOCUMENTS

| | | |
|---|---|---|
| CN | 102270866 A | 12/2011 |
| JP | S63-93738 U | 6/1988 |
| JP | H08-129436 A | 5/1996 |
| JP | H08-140285 A | 5/1996 |
| JP | H10098839 A | 4/1998 |
| JP | 2006-296109 A | 10/2006 |
| JP | 2009-201240 A | 9/2009 |
| WO | 2010/018644 A1 | 2/2010 |

OTHER PUBLICATIONS

Chinese Office Action for CN Application No. 201210548247.8 issued on Jul. 2, 2014 with English Translation.

Japanese Office Action for JP Application No. 2011-277705 mailed on Aug. 6, 2013 with English Translation.

\* cited by examiner

US 9,281,714 B2

UNINTERRUPTIBLE POWER SYSTEM, METHOD OF CONTROLLING POWER SUPPLY, AND RECORDING MEDIUM HAVING POWER SUPPLY CONTROL PROGRAM STORED THEREIN

BACKGROUND OF THE INVENTION

1. Field of the Invention

The present invention relates to an uninterruptible power system, and a method of controlling a power supply and a program in the uninterruptible power system.

2. Description of Related Art

An uninterruptible power system that supplies power accumulated in a rechargeable battery to a load in place of commercial AC power when an abnormality such as interruption of the commercial AC power occurs is known.

As such an uninterruptible power system, a control signal from an operation management device connected in parallel to a plurality of UPSs (Uninterruptible Power Supplies) to control the plurality of UPSs to interwork with one another is disclosed in Japanese Unexamined Patent Application, first Publication (JP-A), No. H10-098839.

However, in the configuration disclosed in JP-A No. H10-098839, each of the plurality of UPSs has an individually complete configuration except that the control signal is common. Accordingly, for example, a rechargeable battery included in one UPS cannot be used for outputting power or charging another UPS unit.

SUMMARY OF THE INVENTION

An object of the invention is to provide an uninterruptible power system, a method of controlling a power supply, and a program capable of resolving the above problem.

An uninterruptible power system as an aspect of the present invention includes: a plurality of uninterruptible power units each including a rechargeable battery, a charging circuit configured to charge the rechargeable battery using input power, and an output circuit configured to output power stored in the rechargeable battery in place of the input power when supply of the input power stops, the uninterruptible power units being connected in parallel to the input power; a path switching unit configured to perform switching of a path for power received among the charging circuit, the rechargeable battery and the output circuit in the plurality of uninterruptible power units; and a control unit configured to control the path switching unit so that switching of the path is performed according to states of the uninterruptible power units.

A method of controlling a power supply in an uninterruptible power system as an aspect of the present invention includes preparing a plurality of uninterruptible power units each including a rechargeable battery, a charging circuit configured to charge the rechargeable battery using input power, and an output circuit configured to output power stored in the rechargeable battery in place of the input power when supply of the input power stops, the uninterruptible power units being connected in parallel to the input power; and controlling a path switching unit so that switching of a path for power received among the charging circuit, the rechargeable battery and the output circuit in the plurality of uninterruptible power units is performed according to the states of the uninterruptible power units.

Further, a program as an aspect of the present invention causes a computer to execute a control step of controlling, according to states of a plurality of uninterruptible power units each including a rechargeable battery, a charging circuit configured to charge the rechargeable battery using input power, and an output circuit configured to output power stored in the rechargeable battery in place of the input power when supply of the input power stops, a path switching unit so that switching of a path for power received among the charging circuit, the rechargeable battery and the output circuit in the plurality of uninterruptible power units is performed, the uninterruptible power units being connected in parallel to the input power.

According to the present invention, in the uninterruptible power system including a plurality of uninterruptible power units, the rechargeable battery, the charging circuit, or the like included in one uninterruptible power unit can be used for another uninterruptible power unit, thereby improving the flexibility of power reception.

DETAILED DESCRIPTION OF EXEMPLARY EMBODIMENTS

Hereinafter, an uninterruptible power system according to an embodiment of the present invention will be described with reference to the drawings.

The uninterruptible power system according to the present embodiment includes, at least, a plurality of uninterruptible power units connected in parallel to input power, a path switching unit that performs switching of a path for power received among a charging circuit, a rechargeable battery and an output circuit in the plurality of uninterruptible power units, and a control unit that controls the path switching unit so that switching of the path is performed according to the state of the uninterruptible power unit.

Figure 1:
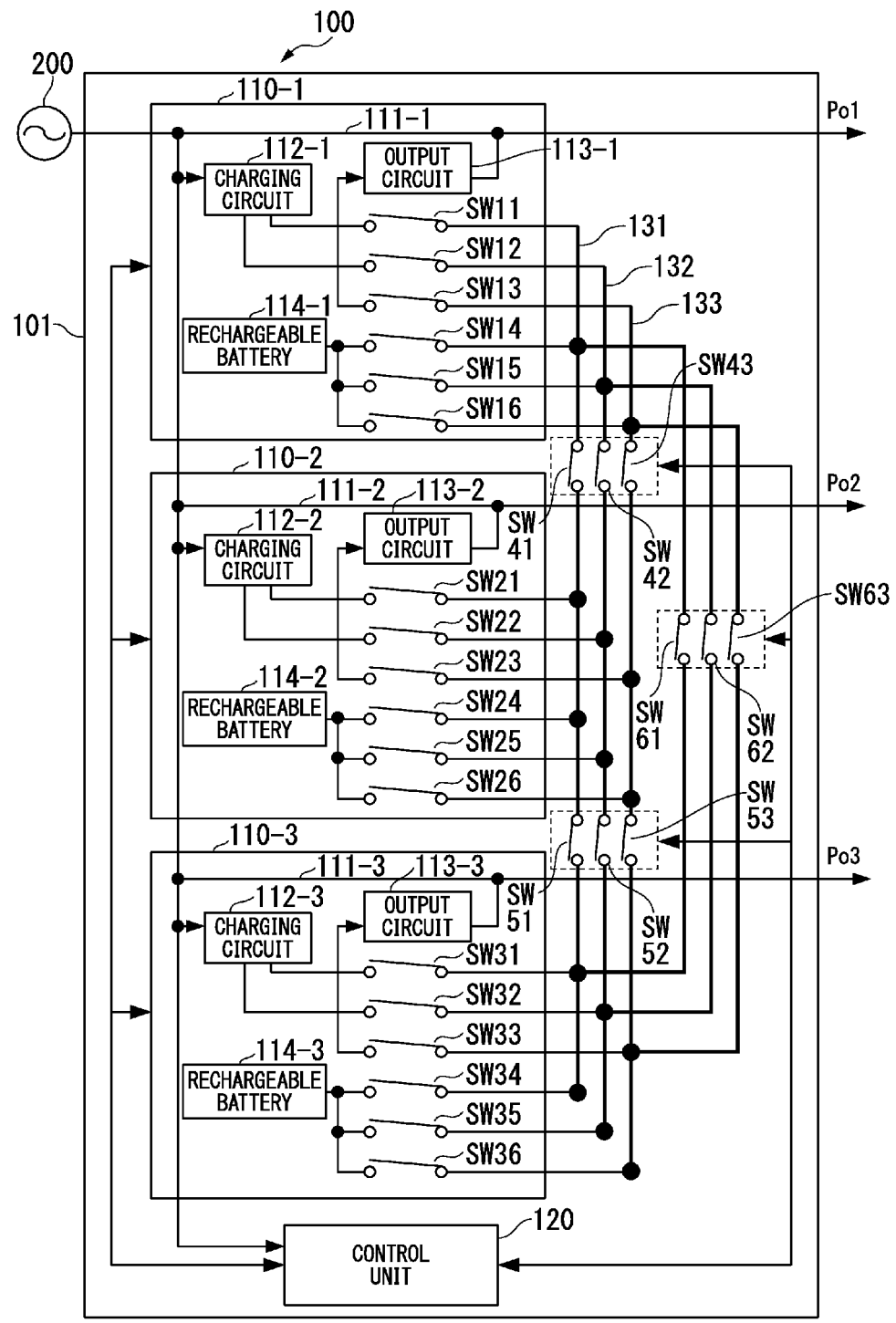
FIG. 1 is a block diagram illustrating an uninterruptible power system according to an embodiment of the present invention.

FIG. 1 illustrates an example of a configuration of an uninterruptible power system 100 in the present embodiment. The uninterruptible power system 100 illustrated in FIG. 1 includes three UPS (Uninterruptible Power Supply) units 110-1, 110-2 and 110-3 and a control unit 120 in a housing 101.

The UPS unit 110-1 is an uninterruptible power unit using a continuous commercial power supply scheme. The continuous commercial power supply scheme is a scheme of outputting commercial AC power (input power) via a surge protection circuit and a noise filter in a normal situation and outputting power from a rechargeable battery, for example, when failure such as interruption of the commercial AC power occurs.

The UPS unit 110-2 is an uninterruptible power unit using a line interactive scheme. The line interactive scheme refers to a scheme for outputting commercial AC power via a surge protection circuit and a noise filter in a normal situation, and determining that failure has occurred when a noise waveform that cannot be removed by the noise filter is detected and outputting power from a rechargeable battery.

The UPS unit 110-3 is an uninterruptible power unit using an inverter scheme. The inverter scheme is a scheme for outputting commercial AC power from a converter via an inverter in a normal situation and outputting power of the rechargeable battery via the inverter when failure occurs.

The commercial AC power 200 is input to the UPS units 110-1 to 110-3 in parallel. In other words, the UPS units 110-1 to 110-3 are included to be parallel to the commercial AC power 200.

The UPS unit 110-1 includes a through path 111-1 that receives the commercial AC power 200 and directly outputs the commercial AC power 200 as output power Po1. Further, the output power Po1 is supplied as power to a predetermined load device. In addition, the UPS unit 110-1 includes a charging circuit 112-1, an output circuit 113-1, a rechargeable battery 114-1 and path switching switches SW11 to SW16.

The charging circuit 112-1 receives the commercial AC power 200 and outputs a charging current. The charging circuit 112-1 outputs two charging currents such as a charging current for rapid charging and a charging current for slow charging. For example, the charging current for rapid charging has a larger current than the charging current for slow charging. The charging current for rapid charging is supplied to a rapid charging line 131 via the path switching switch SW11, and the charging current for slow charging is supplied to a slow charging line 132 via the path switching switch SW12.

When DC power is supplied from a discharging line 133 via the path switching switch SW13, the output circuit 113-1 converts the DC power into AC power and outputs the AC power as the output power Po1.

The rechargeable battery 114-1 performs charging by means of a supplied charging current to accumulate power, and discharges the accumulated power.

Specifically, when the charging current for rapid charging is supplied from the rapid charging line 131 via the path switching switch SW14, the rechargeable battery 114-1 performs rapid charging by means of the charging current for rapid charging. Further, when the charging current for slow charging is supplied from the slow charging line 132 via the path switching switch SW 15, the rechargeable battery 114-1 performs rapid charging by means of the charging current for slow charging. Further, when the rechargeable battery 114-1 is connected with the discharging line 133 via the path switching switch SW 16, the rechargeable battery 114-1 discharges the accumulated power and outputs the power to the discharging line 133.

The UPS unit 110-2 includes a through path 111-2 due to a configuration similar to the UPS unit 110-1. Further, the UPS unit 110-2 includes a charging circuit 112-2, an output circuit 113-2, a rechargeable battery 114-2, and path switching switches SW21 to SW26.

Further, the UPS unit 110-3 includes a through path 111-3 due to a configuration similar to the UPS unit 110-1 and the UPS unit 110-2. Further, the UPS unit 110-3 includes a charging circuit 112-3, an output circuit 113-3, a rechargeable battery 114-3, and path switching switches SW31 to SW36.

Further, a scheme corresponding to each of the UPS units 110-1, 110-2 and 110-3 is not limited to the above-described scheme. Further, each of the UPS units 110-1, 110-2 and 110-3 does not necessarily adopt a different scheme and at least two of them may correspond to the same scheme.

Further, as understood from the above description, the rapid charging line 131 is a line shared by the UPS units 110-1, 110-2 and 110-3 for reception of the charging current for rapid charging. The slow charging line 132 is a line shared by the UPS units 110-1, 110-2 and 110-3 for reception of the charging current for slow charging. The discharging line 133 is a line shared by the UPS units 110-1, 110-2 and 110-3 for reception of discharged power.

Further, in the rapid charging line 131, the slow charging line 132 and the discharging line 133, path switching switches SW41, SW42 and SW43 are connected between the UPS unit 110-1 and the UPS unit 110-2. Similarly, in the rapid charging line 131, the slow charging line 132 and the discharging line 133, path switching switches SW51, SW52 and SW53 are connected between the UPS unit 110-2 and the UPS unit 110-3. Further, path switching switches SW61, SW62 and SW63 are connected between the UPS unit 110-1 and the UPS unit 110-3.

The control unit 120 performs control so that switching of a path for power received among the charging circuits 112-1, 112-2 and 112-3, the output circuits 113-1, 113-2 and 113-3, and the rechargeable batteries 114-1, 114-2, and 114-3 according to predetermined states in the UPS units 110-1, 110-2 and 110-3 is performed. Accordingly, the control unit 120 individually controls on/off of the path switching switches SW11 to SW16, the path switching switches SW21 to SW26, the path switching switches SW31 to SW36, the path switching switches SW41 to SW43, the path switching switches SW51 to SW53, and the path switching switch SW61 to SW63.

Further, hereinafter, the UPS units 110-1, 110-2 and 110-3 are described as a UPS unit 110 when mentioned without particular discrimination. Similarly, the through paths 111-1, 111-2 and 111-3 are described as a through path 111 when mentioned without particular discrimination. The charging circuits 112-1, 112-2 and 111-3 are described as a charging circuit 112 when mentioned without particular discrimination. Further, the output circuits 113-1, 113-2 and 113-3 are described as an output circuit 113 when mentioned without particular discrimination. Further, the rechargeable batteries 114-1, 114-2 and 114-3 are described as a rechargeable battery 114 when mentioned without particular discrimination.

Figure 2:
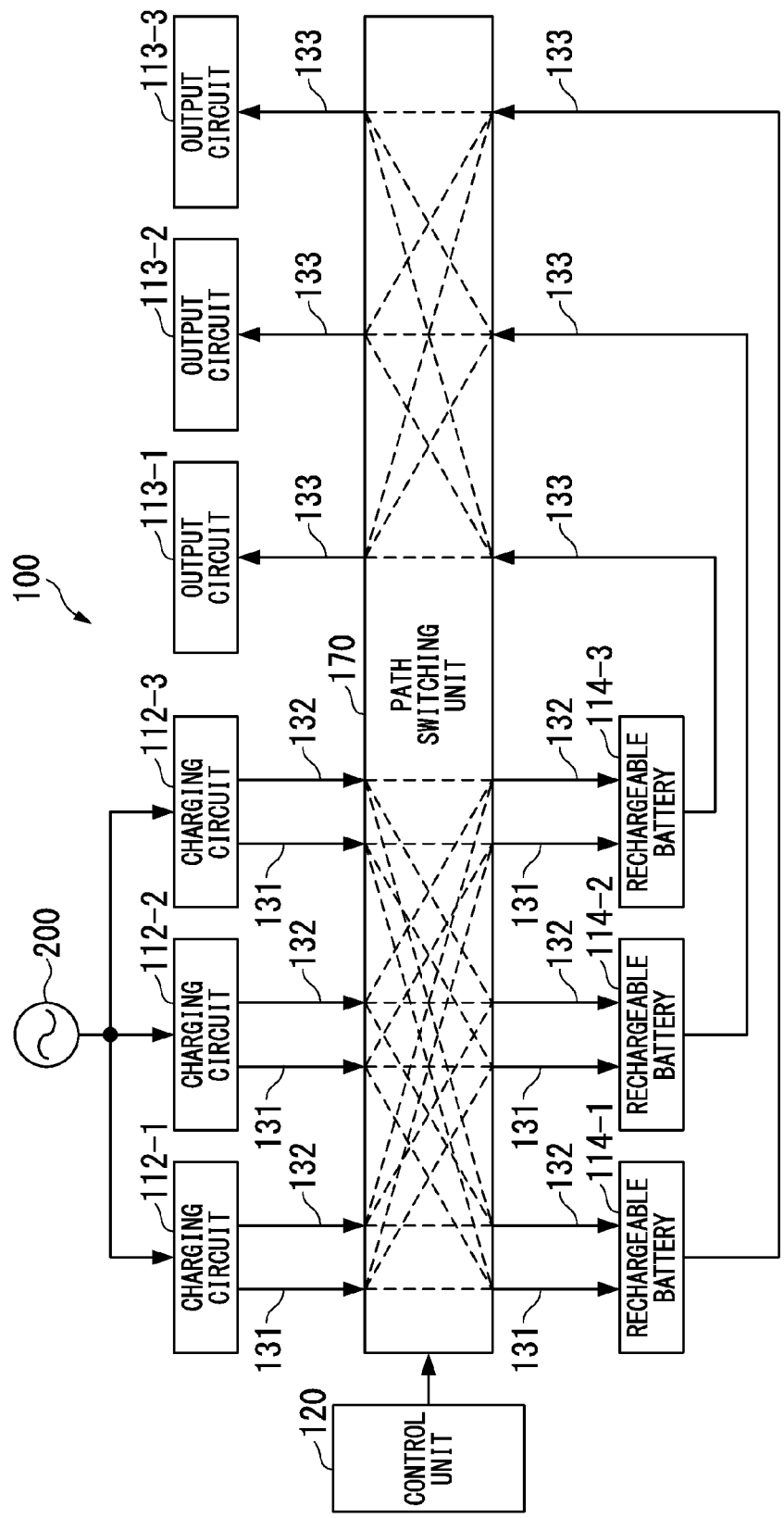
FIG. 2 is a block diagram illustrating a power reception path among a charging circuit, an output circuit and a rechargeable battery in the uninterruptible power system according to an embodiment of the present invention.

FIG. 2 schematically illustrates a power reception path formed among the charging circuit 112, the output circuit 113, and the rechargeable battery 114 realized by the configuration illustrated in FIG. 1. Further, in FIG. 2, the same reference numerals are assigned to the same units as those in FIG. 1.

A path switching unit 170 illustrated in FIG. 2 is a unit in which switching of the path for power among the charging circuits 112-1, 112-2 and 112-3, the output circuits 113-1, 113-2 and 113-3 and the rechargeable batteries 114-1, 114-2, and 114-3 is performed under control of the control unit 120. The path switching unit 170 corresponding to FIG. 1 may be regarded as including the path switching switches SW11 to SW16, the path switching switches SW21 to SW26, the path switching switches SW31 to SW36, the path switching switches SW41 to SW43, the path switching switches SW51 to SW53, and the path switching switches SW61 to SW63.

As illustrated in FIG. 2, the path switching unit 170 may connect the charging circuits 112-1, 112-2 and 112-3 with the rechargeable batteries 114-1, 114-2, and 114-3 via the rapid charging line 131 according to an arbitrary combination.

Further, the path switching unit 170 may connect the charging circuits 112-1, 112-2 and 112-3 with the rechargeable batteries 114-1, 114-2, and 114-3 via the slow charging line 132 according to an arbitrary combination.

Further, the path switching unit 170 may connect the rechargeable batteries 114-1, 114-2, and 114-3 with the output circuits 113-1, 113-2 and 113-3 via the discharging line 133 according to an arbitrary combination.

For example, particularly, the UPS unit 110-1 outputs the input commercial AC power 200 via the through path 111-1 as the output power Po1 in a normal situation in which failure does not occur. Further, the UPS unit 110-1 performs slow charging of the rechargeable battery 114-1 using the charging circuit 112-1 and causes power stored at this time not to be output from the output circuit 113-1 so that the stored power is not discharged.

Similarly, the UPS unit 110-2 outputs the input commercial AC power 200 as output power Po2 via the through path 111-2. Further, the UPS unit 110-2 performs slow charging of the rechargeable battery 114-2 using the charging circuit 112-2 and causes stored power not to be output from the output circuit 113-2.

Similarly, the UPS unit 110-3 outputs the input commercial AC power 200 as output power Po3 via the through path 111-3. Further, the UPS unit 110-3 performs slow charging of the rechargeable battery 114-3 using the charging circuit 112-3 and causes stored power to not be output from the output circuit 113-3.

In other words, in the normal situation, the UPS unit 110 individually operates independently to output the commercial AC power 200 as output power via the through path 111 therein and cause slow charging of the rechargeable battery 114 to be performed using the charging circuit 112.

For this reason, the control unit 120 turns off the path switching switches SW41, SW42, SW43, SW51, SW52, SW53, SW61, SW62, and SW63. Accordingly, the rapid charging line 131, the slow charging line 132 and the discharging line 133 are disconnected between the UPS units 110-1, 110-2, and 110-3. In addition, the control unit 120 turns on the path switching switches SW12 and SW15 in the UPS unit 110-1 and turns off the path switching switches SW11, SW13, SW14 and SW16. Further, the control unit 120 turns on the path switching switches SW22 and SW25 in the UPS unit 110-2 and turns off the path switching switches SW21, SW23, SW24, and SW26.

Further, the control unit 120 turns on the path switching switches SW32 and SW35 in the UPS unit 110-3 and turns off the path switching switches SW31, SW33, SW34, and SW36.

On the other hand, the UPS unit 110-1 is assumed to be in an overload state in which an input current amount is larger than or equal to a previously set specified value, for example, as the load increases. Further, the input current amount may be detected, for example, as follows. That is, a current detection circuit (not shown) that detects an amount of current flowing through the through path 111 is included. Also, the control unit 120 may monitor the current amount detected by the current detection circuit.

In this case, for example, when power for appropriating the current exceeding the specified value has been accumulated in any of the rechargeable batteries 114-1, 114-2, and 114-3, the control unit 120 performs path switching in the path switching unit 170 so that the rechargeable battery 114 is connected with the output circuit 113-1 of the UPS unit 110-1 via the discharging line 133.

Specifically, rechargeable batteries capable of appropriating the current among the rechargeable batteries 114-1, 114-2, and 114-3 are assumed to be the rechargeable battery 114-1 and the rechargeable battery 114-2. In this case, the control unit 120 turns on the path switching switch SW43 in FIG. 1 so that the discharging line 133 of the UPS unit 110-1 and the UPS unit 110-2 is shared. The control unit 120 also turns on the path switching switches SW13 and SW16 in the UPS unit 110-1. The control unit 120 also turns on SW26 in the UPS unit 110-2.

Accordingly, respective power accumulated in the rechargeable battery 114-1 and the rechargeable battery 114-2 is supplied from the discharging line 133 to the output circuit 113-1. The output circuit 113-1 converts the input power into AC power, adjusts a current amount so that the current exceeding the default value is appropriated, and outputs the AC power as the output power Po1.

Thus, in the present embodiment, when any of the UPS units 110 reaches an overload state, the input current from the rechargeable battery 114 in the UPS unit 110 may be appropriated.

Figure 3:
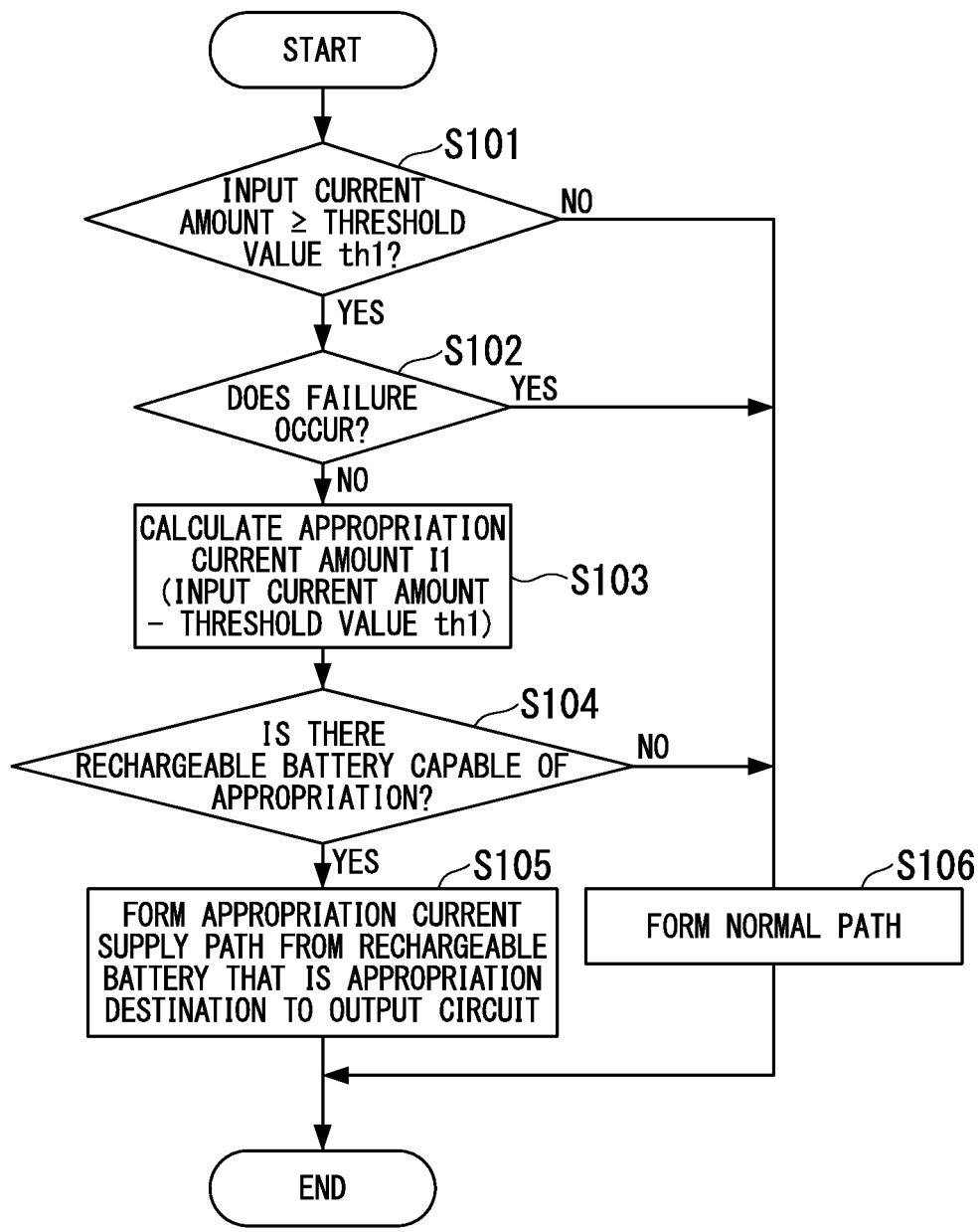
FIG. 3 is a flowchart illustrating a process procedure performed by a control unit with respect to an overload in an embodiment of the present invention.

The flowchart of FIG. 3 illustrates an example of a process procedure executed by the control unit 120 in a state in which any of the UPS units 110 is overloaded as described above. Further, the process illustrated in FIG. 3 is a process in which one UPS unit 110 is a target. The control unit 120 iteratively executes the process illustrated in FIG. 3 at a predetermined timing in parallel for the UPS units 110-1, 110-2 and 110-3.

First, the control unit 120 detects an input current in the UPS unit 110 that is a current processing target and determines whether an amount of the input current is larger than or equal to a threshold value th1 corresponding to the above-described specified value (step S101).

Here, if the input current amount is determined to be smaller than the threshold value th1 (step S101-NO), the UPS unit 110 is not in an overload state but in a normal state. The control unit 120 controls on/off states of the path switching switches, which form the path switching unit 170, so that an operation of the UPS unit 110 corresponding to the normal state is performed as described above (step S106).

On the other hand, if it is determined that the UPS unit 110 is in an overload state in which the input current amount is larger than or equal to the threshold value th1 (step S101-YES), the control unit 120 also determines whether failure has occurred (step S102). Here, one concrete example of the failure that is a determination target may include a state in which the supply of the commercial AC power 200 stops, for example, due to power failure.

If it is determined that the failure has occurred (step S102-YES), each UPS unit 110 other than the target should supply output power from the rechargeable battery 114. In this case, the control unit 120 controls on/off states of the path switching switches in the path switching unit 170 so that a path for power corresponding to the normal state is formed (step S106).

On the other hand, if it is determined that failure does not occur (step S102-NO), the control unit 120 calculates an appropriation current amount I1 (step S103). The appropriation current amount I1 is a current amount exceeding a default value in the input current amount. The control unit 120 calculates the appropriation current amount I1, for example, by subtracting a threshold value th1 (i.e., the default value) from the absolute value of the detected input current amount.

Next, the control unit 120 determines whether there is a rechargeable battery 114 capable of appropriating the appropriation current amount I1 calculated as described above among the rechargeable batteries 114-1, 114-2 and 114-3 (step S104). For this reason, the control unit 120 compares an accumulated power amount in each of the rechargeable batteries 114-1, 114-2 and 114-3 with a predetermined threshold value. If the accumulated power amount is equal to or greater than the threshold value, the rechargeable battery 114 has accumulated a power amount for appropriating the appropriation current amount I1. If the accumulated power amount is smaller than the threshold value, the rechargeable battery 114 has not accumulated the power amount for appropriating the appropriation current amount I1.

If it is determined that there is no rechargeable battery 114 capable of appropriating the appropriation current amount I1 (step S104-NO), the control unit 120 performs control so that the path corresponding to the normal state is formed (step S106). On the other hand, if it is determined that there is the rechargeable battery 114 capable of appropriating the appropriation current amount I1 (step S104-YES), the control unit 120 executes the following process.

That is, the control unit 120 controls on/off states of the path switching switches in the path switching unit 170 so that a path via which the accumulated power of the rechargeable battery 114 capable of appropriation is output to the output circuit 113 in the UPS unit 110 that is a current processing target via the discharging line 133 is formed (step S105). Accordingly, in the UPS unit 110 that is a processing target, the appropriation current amount I1 from the output circuit 113 is combined with the input current from the through path 111 so that appropriation of a current according to an overload is performed.

Further, in the present embodiment, charging of the rechargeable battery 114 may be performed between the UPS units 110 as follows. That is, the remaining amount of the rechargeable battery 114 in one UPS unit 110 is assumed to have been smaller than or equal to a certain amount in a state in which the commercial AC power 200 is supplied. In this case, rapid charging of the rechargeable battery 114 whose remaining amount is smaller than or equal to the certain amount may be performed by the charging circuit 112 available to charge the rechargeable battery 114 whose remaining amount is smaller than or equal to the certain amount among the charging circuits 112 included in the respective UPS units 110.

As one concrete example, the remaining amount of the rechargeable battery 114-1 in the UPS unit 110-1 is assumed to be smaller than or equal to the certain amount. In this case, the charging circuit 112-1 and the charging circuit 112-3 among the charging circuits 112-1, 112-2 and 112-3 are assumed to be available to charge the rechargeable battery 114-1. Since the charging circuit 112-2 performs, for example, rapid charging of the rechargeable battery 114-2 in the same UPS unit 110-2, the charging circuit 112-2 is assumed not to be available to charge the rechargeable battery 114-1.

In this case, the control unit 120 controls the path switching unit 170 to form a path for charging of the rechargeable battery 114-1 of the UPS unit 110-1 using each of the charging circuit 112-1 and the charging circuit 112-3 via the rapid charging line 131.

Specifically, the control unit 120 turns on the path switching switch SW61 in FIG. 1 to cause the rapid charging line 131 to be shared between the UPS unit 110-1 and the UPS unit 110-3. In addition, the control unit 120 turns on the path switching switches SW11 and SW14 in the UPS unit 110-1. The control unit 120 also turns on SW31 in the UPS unit 110-3. Accordingly, rapid charging of the rechargeable battery 114-1 of the UPS unit 110-1 is performed by the charging circuit 112-1 of the UPS unit 110-1 and the charging circuit 112-3 of the UPS unit 110-3 via the rapid charging line 131.

Figure 4:
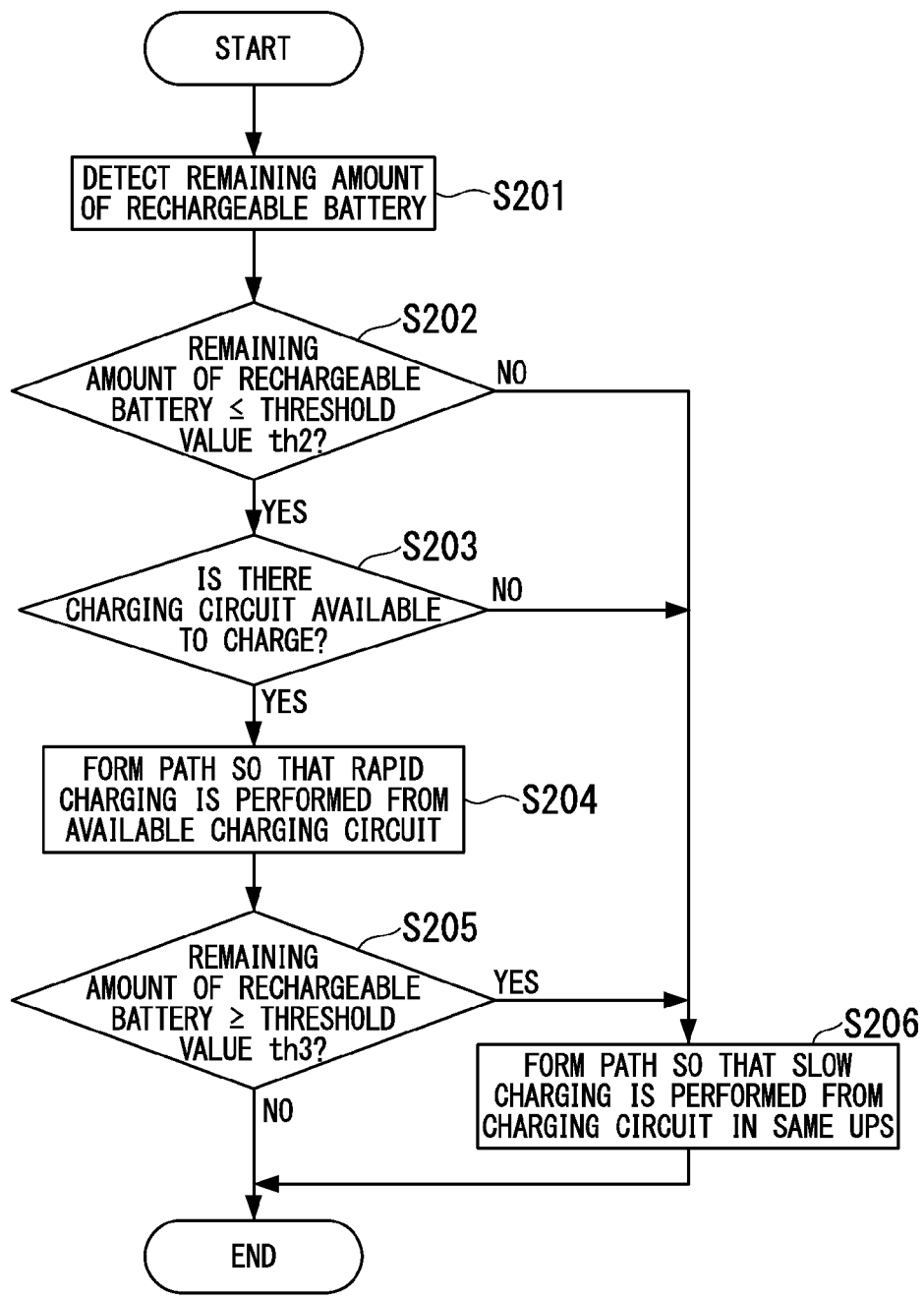
FIG. 4 is a flowchart illustrating a process procedure in which the control unit performs rapid charging of a rechargeable battery in an embodiment of the present invention.

The flowchart of FIG. 4 illustrates an example of a process procedure executed by the control unit 120 to perform rapid charging of the rechargeable battery 114 in any of the UPS units 110 as described above. Further, the process illustrated in FIG. 4 is a process in which the rechargeable battery 114 in one UPS unit 110 is a target. The control unit 120 iteratively executes the process illustrated in FIG. 4 at a predetermined timing in parallel for the rechargeable batteries 114-1, 114-2, and 114-3 of the respective UPS units 110.

First, the control unit 120 detects a remaining amount of the rechargeable battery 114, which is a current processing target (step S201). The control unit 120 then determines whether the detected remaining amount is smaller than or equal to a previously set threshold value th2 (step S202).

Here, if it is determined that the remaining amount is smaller than or equal to the threshold value th2 (step S202-YES), the control unit 120 determines whether there is a charging circuit 112 available to charge the rechargeable battery 114 that is the processing target (step S203).

Here, if it is determined that there is the available charging circuit 112 (step S203-YES), the control unit 120 executes the following process. That is, the control unit 120 forms a path so that charging of the rechargeable battery 114, which is the processing target, is performed by the charging circuit 112 determined to be available in step S202 via the rapid charging line 131 (step S204).

Then, the control unit 120 determines whether the remaining amount of the rechargeable battery 114, which is the processing target, is equal to or greater than a threshold value th3 (th3>th2) (step S205). If it is determined that the remaining amount is smaller than the threshold value th3 (step S205-NO), the rechargeable battery 114 does not yet reach a previously determined charging capacity, which corresponds to completion of rapid charging. In this case, the control unit 120 first ends the process illustrated in FIG. 4 and then restarts the process from step S201 at a predetermined timing.

Also, if it is determined that the remaining amount is equal to or greater than the threshold value th3 (step S205-YES), the control unit 120 executes the following process. That is, the control unit 120 controls on/off states of the path switching switches in the path switching unit 170 so that a path via which slow charging of the rechargeable battery 114 of the processing target is performed by the charging circuit 112 in the same UPS unit 110 is formed (step S206). Further, an operation in which slow charging of the rechargeable battery 114 is performed by the charging circuit 112 in the same UPS unit 110 as described above corresponds to the operation in the normal state. Further, even when it is determined that the remaining amount exceeds the threshold value th2 (step S202-NO) and when it is determined that there is no charging circuit available to charge the rechargeable battery 114, which is the processing target (step S203-NO), the control unit 120 executes the process of step S206.

Further, when backup of a device is performed as the supply of the commercial AC power 200 stops, for example, due to power failure, the uninterruptible power system 100 of the present embodiment operates as follows as the remaining amount of the rechargeable battery 114 is smaller than or equal to a certain amount.

In the uninterruptible power system 100 of the present embodiment, a different priority is set for each UPS unit 110. Here, it is assumed that the priority of the UPS unit 110-1 is highest, the priority of the UPS unit 110-2 is next highest, and the priority of the UPS unit 110-3 is lowest. The priorities correspond to, for example, priorities of backup for load devices connected to the UPS units 110-1, 110-2 and 110-3. This implies that the backup of the load device connected to the UPS unit 110-1 has the highest priority.

If the supply of the commercial AC power 200 stops, for example, due to power failure, the control unit 120 first performs control so that each of the UPS units 110-1, 110-2 and 110-3 independently performs backup of the load device. In other words, the control unit 120 performs control so that a path via which the power accumulated in the rechargeable battery 114-1 is supplied to only the output circuit 113-1 via the discharging line 133 is formed in the UPS unit 110-1. Further, the control unit 120 performs control so that a path via which the power accumulated in the rechargeable battery 114-2 is supplied to only the output circuit 113-2 via the discharging line 133 is formed in the UPS unit 110-2. Further, the control unit 120 performs control so that a path via which the power accumulated in the rechargeable battery 114-3 is supplied to only the output circuit 113-3 via the discharging line 133 is formed in the UPS unit 110-3.

In this case, as states of the path switching switches in FIG. 1, any of the path switching switches SW43, SW53 and SW63 is turned off to disconnect the discharging line 133 between the UPS units 110-1, 110-2, and 110-3. In addition, the path switching switches SW13 and SW16 in the UPS unit 110-1 are turned on to supply the power from the rechargeable battery 114-1 to the output circuit 113-1 via the discharging line 133. Similarly, the path switching switches SW23 and SW26 in the UPS unit 110-2 are turned on to supply the power from the rechargeable battery 114-2 to the output circuit 113-2 via the discharging line 133. Further, the path switching switches SW33 and SW36 in the UPS unit 110-3 are turned on to supply the power from the rechargeable battery 114-3 to the output circuit 113-3 via the discharging line 133.

As the backup is performed as described above, the remaining amount of each rechargeable battery 114 is gradually reduced over time. Also, in the present embodiment, when the remaining amount of the rechargeable battery 114 in one UPS unit 110 is smaller than or equal to the certain amount, the power of the rechargeable battery 114 in the UPS unit 110 having a lower priority than such a UPS unit 110 is also used for backup of the UPS unit 110 having a higher priority.

As one concrete example, the remaining amount of the rechargeable battery 114 in the UPS unit 110-1 is assumed to be smaller than or equal to the certain amount in backup. In this case, the UPS unit 110-1 has the highest priority. The control unit 120 controls the path so that power discharged from the rechargeable battery 114-2 in the UPS unit 110-2 and the rechargeable battery 114-3 in the UPS unit 110-3 that have lower priorities is also supplied to the output circuit 113-1 of the UPS unit 110-1 via the discharging line 133.

In this case, the control unit 120 turns on the path switching switches SW43 and SW53 to cause the discharging line 133 to be shared by the UPS units 110-1, 110-2 and 110-3. Further, the control unit 120 maintains the on-state of the path switching switches SW13 and SW16 in the UPS unit 110-1, similar to the state before the remaining amount is smaller than or equal to a certain amount. In addition, the control unit 120 turns on the path switching switch SW26 in the UPS unit 110-2 and the path switching switch SW36 in the UPS unit 110-3. Accordingly, the powers from the rechargeable batteries 114-2 and 114-3 as well as the rechargeable battery 114-1 are supplied to the output circuit 113-1 of the UPS unit 110-1. Accordingly, the device to which the output power Po1 of the UPS unit 110-1 having the highest priority of backup is supplied can be operated for as long a period of time as possible.

Figure 5:
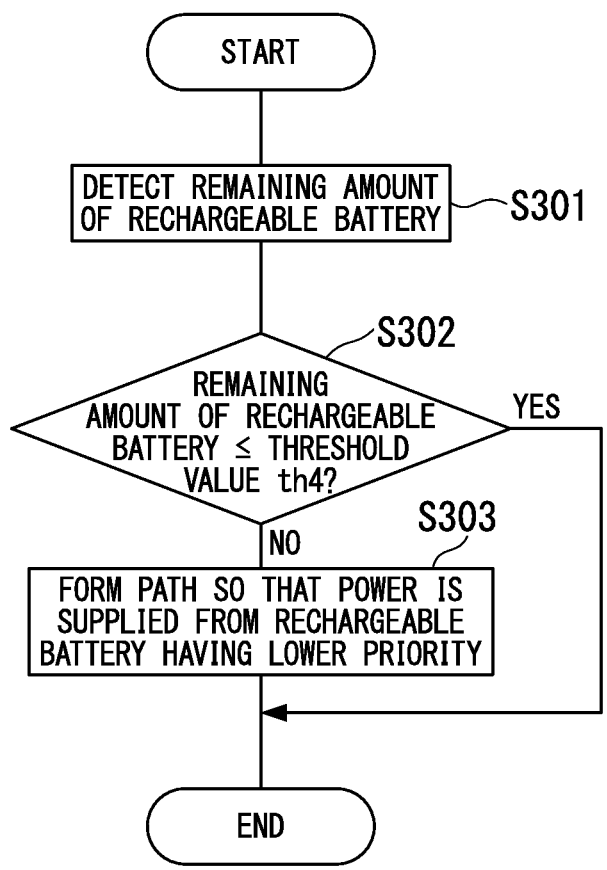
FIG. 5 is a flowchart illustrating a process procedure performed by the control unit to control power supply in an embodiment of the present invention.

FIG. 5 illustrates an example of a process procedure executed by the control unit 120 in order to control power supply from the rechargeable battery 114 to the output circuit 113 according to the priority of the UPS unit 110 at the time of backup as described above. Further, the process illustrated in FIG. 5 is a process in which one UPS unit 110 is a target. The control unit 120 iteratively executes the process illustrated in FIG. 5 at a predetermined timing in parallel for the UPS units 110-1, 110-2 and 110-3.

First, the control unit 120 detects the remaining amount of the rechargeable battery 114 in the UPS unit 110 that is a processing target (step S301). The control unit 120 then determines whether the detected remaining amount is smaller than or equal to a threshold value th4 (step S302).

If it is determined that the remaining amount exceeds the threshold value th4 (step S302-NO), there is still room in the remaining amount of the rechargeable battery 114 in the UPS unit 110, which is a processing target. In this case, the control unit 120 first ends the process illustrated in FIG. 5 and then restarts the process from step S301 at a predetermined timing.

On the other hand, if it is determined that the remaining amount is smaller than or equal to the threshold value th4 (step S302-YES), there is no room in the remaining amount of the rechargeable battery 114 in the UPS unit 110, which is a processing target. In this case, the control unit 120 controls the path switching switches in the path switching unit 170 so that a path via which power is supplied from the rechargeable battery 114 in the UPS unit 110 having a lower priority than the UPS unit 110 which is the processing target to the output circuit 113 of the UPS unit 110 which is the processing target is formed (step S303).

Further, in the above description, as the remaining amount of the rechargeable battery 114 in one UPS unit 110 is smaller than or equal to the certain amount, switching of the path is performed so that the power is supplied from the rechargeable batteries 114 in all the UPS units 110 having lower priorities. Other method of assigning the rechargeable battery 114 according to a priority in backup may be considered. As one example, the following method of assigning the rechargeable battery 114 may be considered. That is, when the remaining amount of the rechargeable battery 114 in one UPS unit 110 is smaller than or equal to the certain amount, first, the power is supplied from the rechargeable battery 114 in the UPS unit 110 having the lowest priority among the UPS units 110 having lower priorities. Also, as the remaining amount of the rechargeable battery 114 of the UPS unit 110 having the lowest priority disappears, the power is supplied from the rechargeable battery 114 of the UPS unit 110 having the next lowest priority. This is iteratively performed.

Further, in the present embodiment, the uninterruptible power system 100 includes the plurality of UPS units 110 using different schemes in parallel in the housing 101, making it possible to supply power using an appropriate scheme according to usage of a load device through one uninterruptible power system 100.

Further, in the present embodiment, for example, even when the rechargeable battery 114 in any of the UPS units 110 is pulled out in a state in which the uninterruptible power system 100 is in operation, for example, the power is supplied from the rechargeable battery 114 of the other UPS unit 110. In other words, a unit such as the rechargeable battery 114 in the uninterruptible power system 100 can be hot-swapped.

Further, in the present embodiment, even when a fault such as failure of the charging circuit 112 or the rechargeable battery 114 has occurred, for example, charging may be performed by the charging circuit 112 of the other UPS unit 110 or power may be supplied from the rechargeable battery 114 in the other UPS unit 110. In other words, it is possible to continuously operate the uninterruptible power system 100 by removing a faulty circuit.

Figure 6:
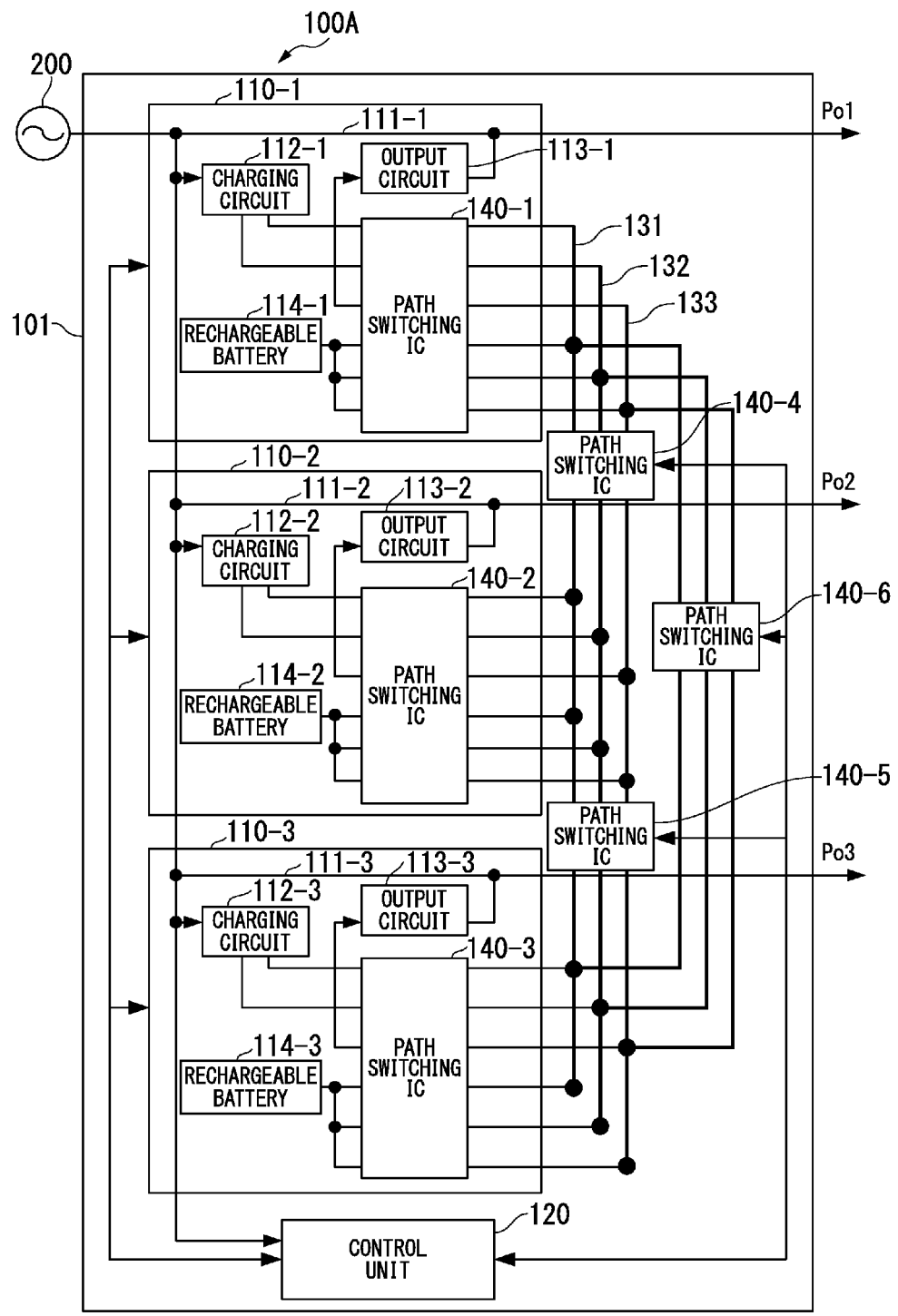
FIG. 6 is a block diagram illustrating an uninterruptible power system according to a variant of the embodiment of the present invention.

FIG. 6 illustrates an example of a configuration of an uninterruptible power system 100A according to a variant. Further, in FIG. 6, the same reference numerals are assigned to the same units as those in FIG. 1 and a description of the same units will be omitted. The uninterruptible power system 100A illustrated in FIG. 6 includes a path switching IC (Integrated Circuit) 140-1 in place of the path switching switches SW11, SW12, SW13, SW14, SW15 and SW16. The path switching IC 140-1 performs switching of a path, which corresponds to individual turning-on/off of the path switching switches SW11, SW12, SW13, SW14, SW15 and SW16 in FIG. 1 under control of a control unit 120.

Further, the uninterruptible power system 100A includes a path switching IC 140-2 in place of the path switching switches SW21, SW22, SW23, SW24, SW25 and SW26. The path switching IC 140-2 performs switching of a path, which corresponds to individual turning-on/off of the path switching switches SW21, SW22, SW23, SW24, SW25 and SW26 in FIG. 1 under control of the control unit 120.

Further, the uninterruptible power system 100A includes a path switching IC 140-3 in place of the path switching switches SW31, SW32, SW33, SW34, SW35 and SW36. The path switching IC 140-3 performs switching of a path, which corresponds to individual turning-on/off of SW31, SW32, SW33, SW34, SW35 and SW36 in FIG. 1 under control of the control unit 120.

Further, the uninterruptible power system 100A includes a path switching IC 140-4 in place of the path switching switches SW41, SW42, and SW43. The path switching IC 140-4 performs switching of a path, which corresponds to individual turning-on/off of the path switching switches SW41, SW42 and SW43 in FIG. 1 under control of the control unit 120.

Further, the uninterruptible power system 100A includes a path switching IC 140-5 in place of the path switching switches SW51, SW52 and SW53. The path switching IC 140-5 performs switching of a path, which corresponds to individual turning-on/off of path switching switches SW51, SW52 and SW53 in FIG. 1 under control of the control unit 120.

Further, the uninterruptible power system 100A includes a path switching IC 140-6 in place of the path switching switches SW61, SW62, and SW63. The path switching IC 140-6 performs switching of a path, which corresponds to individual turning-on/off of the path switching switches SW61, SW62 and SW63 in FIG. 1 under control of the control unit 120.

In the uninterruptible power system 100A having such a configuration, the paths among the charging circuit 112, the output circuit 113 and the rechargeable battery 114 in the respective UPS units 110 can be switched as described with reference to FIG. 2. In addition, in the uninterruptible power system 100A, the path switching switches are omitted. Accordingly, for example, it is possible to avoid an increase in the number of path switching switches according to an increase in the number of UPS units 110.

Further, a program for realizing a function as the control unit 120 in the present embodiment may be recorded in a computer-readable recording medium, and the program recorded in the recording medium may be read and executed by a computer system to perform an execution process. Further, the "computer system" noted herein may include an operating system (OS) and hardware such as peripheral devices. Further, the "computer system" includes a WWW system including a homepage provision environment (or a display environment). Further, the "computer-readable recording medium" includes a storage device, including a portable medium such as a flexible disk, a magneto-optical disc, a ROM or a CD-ROM, or a hard disk embedded in the computer system. Further, the "computer-readable recording medium" includes a medium for holding a program for a certain period of time, such as a volatile memory (a DRAM) inside a computer system configured of a server and a client when the program is transmitted via a network such as the Internet or a communication line such as a telephone line.

Further, the program may be transmitted from a computer system storing the program in a storage device to other computer systems via a transmission medium or by a transmission wave in the transmission medium. Here, the "transmission medium" transmitting the program is a medium having a function of transmitting information, such as a network (communication network) such as the Internet or a communication line such as a telephone line. Further, the program may be a program for realizing a portion of the above-described function. Further, the program may be a program capable of realizing the above-described function through a combination with a program already recorded in the computer system, i.e., may be a differential file (differential program).

Some or all of the exemplary embodiments are described as the following notes, but are not limited to the following:

(Supplementary note 1) An uninterruptible power system including:

a plurality of uninterruptible power units each including a rechargeable battery, a charging circuit configured to charge the rechargeable battery using input power, and an output circuit configured to output power stored in the rechargeable battery in place of the input power when supply of the input power stops, the uninterruptible power units being connected in parallel to the input power;

a path switching unit configured to perform switching of a path for power received among the charging circuit, the rechargeable battery and the output circuit in the plurality of uninterruptible power units; and a control unit configured to control the path switching unit so that switching of the path is performed according to states of the uninterruptible power units.

(Supplementary note 2) The uninterruptible power system according to Supplementary note 1, wherein the path switching unit performs switching of the path in such a manner that any of the rechargeable batteries is charged by any of the charging circuits or switching of the path in such a manner that power is supplied from any of the rechargeable batteries to any of the output circuits.

(Supplementary note 3) The uninterruptible power system according to Supplementary note 1 or 2, wherein the control unit controls the path switching unit for the uninterruptible power unit that is a power appropriation target whose input current is larger than or equal to a threshold value, to switch to a path via which power from the rechargeable battery in the other uninterruptible power unit is supplied to the output circuit in the uninterruptible power unit that is the power appropriation target.

(Supplementary note 4) The uninterruptible power system according to any one of Supplementary notes 1 to 3, wherein the control unit controls the path switching unit to switch to a path via which charging of the rechargeable battery that is a charging target whose remaining amount is smaller than or equal to a certain amount is performed by the charging circuit in the uninterruptible power unit including the rechargeable battery that is the charging target, as well as by the charging circuits of the uninterruptible power units other than the uninterruptible power unit including the rechargeable battery that is the charging target.

(Supplementary note 5) The uninterruptible power system according to any one of Supplementary notes 1 to 4, wherein:

different priorities are set in the plurality of uninterruptible power units, and the control unit controls the path switching unit to switch to a path via which power from the rechargeable battery of the uninterruptible power unit having a lower priority is supplied to the output circuit of one uninterruptible power unit when the power of the rechargeable battery is output from the uninterruptible power unit.

(Supplementary note 6) A method of controlling a power supply in an uninterruptible power system, the method including:

preparing a plurality of uninterruptible power units each including a rechargeable battery, a charging circuit configured to charge the rechargeable battery using input power, and an output circuit configured to output power stored in the rechargeable battery in place of the input power when supply of the input power stops, the uninterruptible power units being connected in parallel to the input power; and controlling a path switching unit so that switching of a path for power received among the charging circuit, the rechargeable battery and the output circuit in the plurality of uninterruptible power units is performed according to states of the uninterruptible power units.

(Supplementary note 7) A program for causing a computer to execute a control step of controlling, according to states of a plurality of uninterruptible power units each including a rechargeable battery, a charging circuit configured to charge the rechargeable battery using input power, and an output circuit configured to output power stored in the rechargeable battery in place of the input power when supply of the input power stops, a path switching unit so that switching of a path for power received among the charging circuit, the rechargeable battery and the output circuit in the plurality of uninterruptible power units is performed, the uninterruptible power units being connected in parallel to the input power.

Incorporation by Reference

This application claims the benefits of Japanese Patent Application No. 2011-277705, filed Dec. 19, 2011, the disclosure of which is hereby incorporated herein by reference in its entirety.

What is claimed is:

1. An uninterruptible power system comprising:
  a plurality of uninterruptible power units each including a rechargeable battery, a charging circuit configured to charge the rechargeable battery using input power, and an output circuit configured to output power stored in the rechargeable battery in place of the input power when supply of the input power stops, the uninterruptible power units being connected in parallel to the input power;
  a path switching unit configured to perform switching of a path for power received among the charging circuit, the rechargeable battery and the output circuit in the plurality of uninterruptible power units; and
  a control unit configured to control the path switching unit so that switching of the path is performed according to states of the uninterruptible power units,
  wherein the control unit controls the path switching unit to switch to a path via which rapid charging of the rechargeable battery that is a charging target, whose remaining amount is smaller than or equal to a first threshold amount, is performed by the charging circuit in the uninterruptible power unit including the rechargeable battery that is the charging target, as well as by the charging circuits of the uninterruptible power units other than the uninterruptible power unit including the rechargeable battery that is the charging target, and
  wherein the control unit controls the path switching unit to switch to a path via which slow charging of the rechargeable battery that is a charging target, whose remaining amount is greater than or equal to a second threshold amount, is performed by the charging circuit in the uninterruptible power unit including the rechargeable battery that is the charging target, the second threshold amount being greater than the first threshold amount.

2. The uninterruptible power system according to claim 1, wherein the path switching unit performs switching of the path in such a manner that any of the rechargeable batteries is charged by any of the charging circuits or switching of the path in such a manner that power is supplied from any of the rechargeable batteries to any of the output circuits.

3. The uninterruptible power system according to claim 1, wherein the control unit controls the path switching unit for the uninterruptible power unit that is a power appropriation target whose input current is larger than or equal to a threshold value, to switch to a path via which power from the rechargeable battery in the other uninterruptible power unit is supplied to the output circuit in the uninterruptible power unit that is the power appropriation target.

4. The uninterruptible power system according to claim 1, wherein:
  different priorities are set in the plurality of uninterruptible power units, and
  the control unit controls the path switching unit to switch to a path via which power from the rechargeable battery of the uninterruptible power unit having a lower priority is supplied to the output circuit of one uninterruptible power unit when the power of the rechargeable battery is output from the uninterruptible power unit.

5. A method of controlling a power supply in an uninterruptible power system, the method comprising:
  preparing a plurality of uninterruptible power units each including a rechargeable battery, a charging circuit configured to charge the rechargeable battery using input power, and an output circuit configured to output power stored in the rechargeable battery in place of the input power when supply of the input power stops, the uninterruptible power units being connected in parallel to the input power; and
  controlling a path switching unit so that switching of a path for power received among the charging circuit, the rechargeable battery and the output circuit in the plurality of uninterruptible power units is performed according to states of the uninterruptible power units
  wherein, in the controlling step, controlling the path switching unit to switch to a path via which rapid charging of the rechargeable battery that is a charging target, whose remaining amount is smaller than or equal to a first threshold amount, is performed by the charging circuit in the uninterruptible power unit including the rechargeable battery that is the charging target, as well as by the charging circuits of the uninterruptible power units other than the uninterruptible power unit including the rechargeable battery that is the charging target, and
  wherein, in the controlling step, controlling the path switching unit to switch to a path via which slow charging of the rechargeable battery that is a charging target, whose remaining amount is greater than or equal to a second threshold amount, is performed by the charging circuit in the uninterruptible, power unit including the rechargeable battery that is the charging target, the second threshold amount being greater than the first threshold amount.

6. A non-transitory computer-readable recording medium having a program stored therein for causing a computer to execute a control step of controlling, according to states of a plurality of uninterruptible power units each including a rechargeable battery, a charging circuit configured to charge the rechargeable battery using input power, and an output circuit configured to output power stored in the rechargeable battery in place of the input power when supply of the input power stops, a path switching unit so that switching of a path for power received among the charging circuit, the rechargeable battery and the output circuit in the plurality of uninterruptible power units is performed, the uninterruptible power units being connected in parallel to the input power, wherein, in the control step, controlling the path switching unit to switch to a path via which rapid charging of the rechargeable battery that is a charging target, whose remaining amount is smaller than or equal to a first threshold amount, is performed by the charging circuit in the uninterruptible power unit including the rechargeable battery that is the charging target, as well as by the charging circuits of the uninterruptible power units other than the uninterruptible power unit including the rechargeable battery that is the charging target, and wherein, in the control step, controlling the path switching unit to switch to a path via which slow charging of the rechargeable battery that is a charging target, whose remaining amount is greater than or equal to a second threshold amount, is performed by the charging circuit in the uninterruptible power unit including the rechargeable battery that is the charging target the second threshold amount being greater than the first threshold amount.

\* \* \* \* \*